United States Patent
Costa et al.

(10) Patent No.: US 7,797,809 B2
(45) Date of Patent: Sep. 21, 2010

(54) ZERO ACOUSTIC SPLICE FAN CASE LINER

(75) Inventors: Mark W. Costa, Storrs, CT (US); Charles Brown, East Hampton, CT (US); Andrew S. Foose, Vernon, CT (US)

(73) Assignee: United Technologies Corporation, Hartford, CT (US)

( * ) Notice: Subject to any disclaimer, the term of this patent is extended or adjusted under 35 U.S.C. 154(b) by 244 days.

(21) Appl. No.: 11/954,680

(22) Filed: Dec. 12, 2007

(65) Prior Publication Data

US 2008/0092362 A1    Apr. 24, 2008

Related U.S. Application Data

(62) Division of application No. 10/899,809, filed on Jul. 27, 2004, now Pat. No. 7,328,771.

(51) Int. Cl.
*B23P 25/00* (2006.01)
*F02K 1/82* (2006.01)

(52) U.S. Cl. ................ 29/458; 29/557; 29/558

(58) Field of Classification Search .......... 181/292, 181/214, 210, 213; 244/1 N, 53 B, 131, 132; 29/428, 557, 558, 527.1, 527.2, 458
See application file for complete search history.

(56) References Cited

U.S. PATENT DOCUMENTS

| 3,607,595 A | 9/1971 | Windecker |
| 3,702,220 A | 11/1972 | Medawar et al. |
| 3,821,999 A | 7/1974 | Guess et al. |
| 4,161,231 A | 7/1979 | Wilkinson |
| 4,293,053 A | 10/1981 | Shuttleworth et al. |
| 4,850,093 A * | 7/1989 | Parente ................. 29/428 |
| 5,000,399 A | 3/1991 | Readnour et al. |
| 5,297,760 A | 3/1994 | Hart-Smith |
| 5,339,745 A * | 8/1994 | Ritzl et al. .............. 105/452 |
| 5,581,054 A | 12/1996 | Anderson et al. |

(Continued)

FOREIGN PATENT DOCUMENTS

EP    0572725    6/1992

(Continued)

OTHER PUBLICATIONS

Japanese Office Action mailed Oct. 16, 2007.

(Continued)

*Primary Examiner*—Essama Omgba
(74) *Attorney, Agent, or Firm*—Carlson, Gaskey & Olds

(57) ABSTRACT

A liner assembly for a fan case includes a noise attenuation layer covered by a face sheet. The face sheet includes openings to the underlying noise attenuation layer. The face sheet and noise attenuation layer include acoustically transparent joints. The noise attenuation layer includes a first side joined to a second side at a seam by an adhesive strip. The adhesive strip bonds the first side to the second side without filling any chambers. The face sheet includes a joint filled with an adhesive providing the desired uninterrupted surface within the fan case. Openings are formed through the joint and the adhesive to communicate with the underlying noise attenuation layer. The joint and seam become essentially transparent acoustically to improve noise attenuation performance.

6 Claims, 2 Drawing Sheets

U.S. PATENT DOCUMENTS

| | | | |
|---|---|---|---|
| 5,776,579 A | 7/1998 | Jessup et al. | |
| 6,131,855 A | 10/2000 | Porte | |
| 6,328,261 B1 | 12/2001 | Wollaston et al. | |
| 6,340,135 B1 | 1/2002 | Barton | |
| 6,427,434 B2 | 8/2002 | Porte et al. | |
| 6,536,556 B2 | 3/2003 | Porte et al. | |
| 6,585,191 B2 | 7/2003 | Andre et al. | |
| 6,592,078 B2 | 7/2003 | Porte et al. | |
| 6,607,625 B2 | 8/2003 | Andre et al. | |
| 6,615,950 B2 | 9/2003 | Porte et al. | |
| 6,761,245 B2 | 7/2004 | Porte | |
| 6,772,857 B2 | 8/2004 | Porte et al. | |
| 6,820,337 B2 | 11/2004 | Buge et al. | |
| 6,892,526 B2 | 5/2005 | Stretton et al. | |
| 6,913,164 B2 * | 7/2005 | Duquette | 220/528 |
| 6,923,931 B2 | 8/2005 | Dublineau et al. | |
| 7,257,894 B2 * | 8/2007 | Buge et al. | 29/890.01 |
| 7,296,656 B2 * | 11/2007 | Sanicki et al. | 181/210 |
| 7,328,771 B2 * | 2/2008 | Costa et al. | 181/214 |
| 7,540,354 B2 * | 6/2009 | Morin et al. | 181/292 |
| 2002/0078569 A1 | 6/2002 | Buge et al. | |
| 2002/0125067 A1 | 9/2002 | Porte et al. | |
| 2003/0042657 A1 | 3/2003 | Dublineau et al. | |
| 2004/0045766 A1 | 3/2004 | Porte et al. | |
| 2005/0228331 A1 * | 10/2005 | Tseng et al. | 602/58 |
| 2008/0217044 A1 * | 9/2008 | Carlson et al. | 174/113 R |

FOREIGN PATENT DOCUMENTS

| | | |
|---|---|---|
| EP | 0572725 | 12/1993 |
| EP | 1419880 | 8/2004 |
| GB | 2391059 | 1/2004 |
| JP | 6-504629 | 5/1994 |
| JP | 2004-155193 | 6/2004 |
| WO | 92/12854 | 8/1992 |
| WO | 02/059474 | 8/2002 |

OTHER PUBLICATIONS

European Search Report dated Jun. 4, 2009.
Partial European Search Report dated Oct. 29, 2008.

* cited by examiner

ZERO ACOUSTIC SPLICE FAN CASE LINER

CROSS REFERENCE TO RELATED APPLICATION

The application is a divisional application of U.S. application Ser. No. 10/899,809 which was filed on Jul. 27, 2004 now U.S. Pat. No. 7,328,771.

BACKGROUND OF THE INVENTION

This invention generally relates to a fan case for turbine engines, and more particularly to a fan case liner including an acoustically active joint.

Conventional turbine and turbofan engines for aircraft include a plurality of turbine blades that rotate within a fan case. The fan case serves as a protective covering to protect the turbine blades and the aircraft. Further the fan case channels airflow into the turbine engine. The inner surface of the fan case is constructed to withstand impacts from objects that may come into contact with the fan case. Further, the inner surface of the fan case includes acoustical features to reduce the noise emitted from the engine.

Restrictions on the amount of noise emitted from a turbine engine are becoming stricter. Accordingly, increased efforts are underway to further reduce the noise emitted from an aircraft engine. It is known to provide a fan case liner with a layer of noise attenuation structures and a face layer including a plurality of openings. The face layer is typically a thin sheet of metal or composite material that provides protection to the noise attenuation structure. Noise causing pressure disturbances emanate through the openings within the face layer into the noise attenuation structure where the pressure disturbances dissipate to reduce the total amount of noise.

The fan case liner includes joints between the several pieces of material used to form the inner surface. These joints typically are required to accommodated assembly of the noise attenuation structure and face layer onto the inside wall of the fan case as well as being able to handle loads generated by thermal expansion. The joint includes a seam within both the noise attenuation structure and the face layer. The seam is typically filled to minimize detrimental effects to airflow through the fan case. The filled in seam typically results in an acoustically dead area relative to the rest of the fan case liner. The acoustically dead area reduces the effectiveness of the fan liner such that noise emitted from the engine may exceed desired levels.

Accordingly, it is desirable to develop a joint and seam for a fan case liner that is acoustically active to improve noise attenuation properties of the fan case liner.

SUMMARY OF THE INVENTION

This invention is a fan case liner assembly that includes an acoustically active joint to improve noise attenuation performance.

The liner assembly forms an inner surface of the fan case and includes noise attenuation features. The liner assembly includes a noise attenuation layer covered by a face sheet. The face sheet includes a first plurality of openings that provide communication to the noise attenuation layer. The noise attenuation layer includes a plurality of chambers that are in communication with at least one of the first plurality of openings.

The noise attenuation layer includes a first side joined to a second side at a seam by an adhesive strip. Conventional seams included adhesive that fill one or two rows of chambers on each side of the seam that can result in an undesirable acoustically dead zone. The seam of this invention utilizes the adhesive strip that bonds the first side to the second side without filling any of the adjacent chambers. The result is that the seam is essentially transparent acoustically.

The face sheet includes a first end attached to a second end at a joint. The joint accommodates expansion and contraction of the face sheet that occurs as a result of the extreme temperatures encountered during typical operation. The joint includes overlapping portions that form a structural connection of the face liner ends that is filled with an adhesive. Overlapping the first and second ends, along with filling of the seam with adhesive results in a strip of blocked openings. Blocking of the openings results in an acoustically dead area the size of the overlapped region that degrades acoustic performance of the liner assembly. A second plurality of openings is formed within the overlapped region to communicate with the noise attenuation layer disposed under the overlapped region. Formation of the second plurality of openings within the overlapped region provides an acoustically live joint that adds to the attenuation of noise from the engine.

The joint and seam for the face sheet and the noise attenuation layer provide acoustically superior performance relative to conventional joining techniques. The joint and seam are substantially transparent acoustically and improve noise attenuation performance.

These and other features of the present invention can be best understood from the following specification and drawings, the following of which is a brief description.

DETAILED DESCRIPTION OF THE PREFERRED EMBODIMENT

Figure 1:
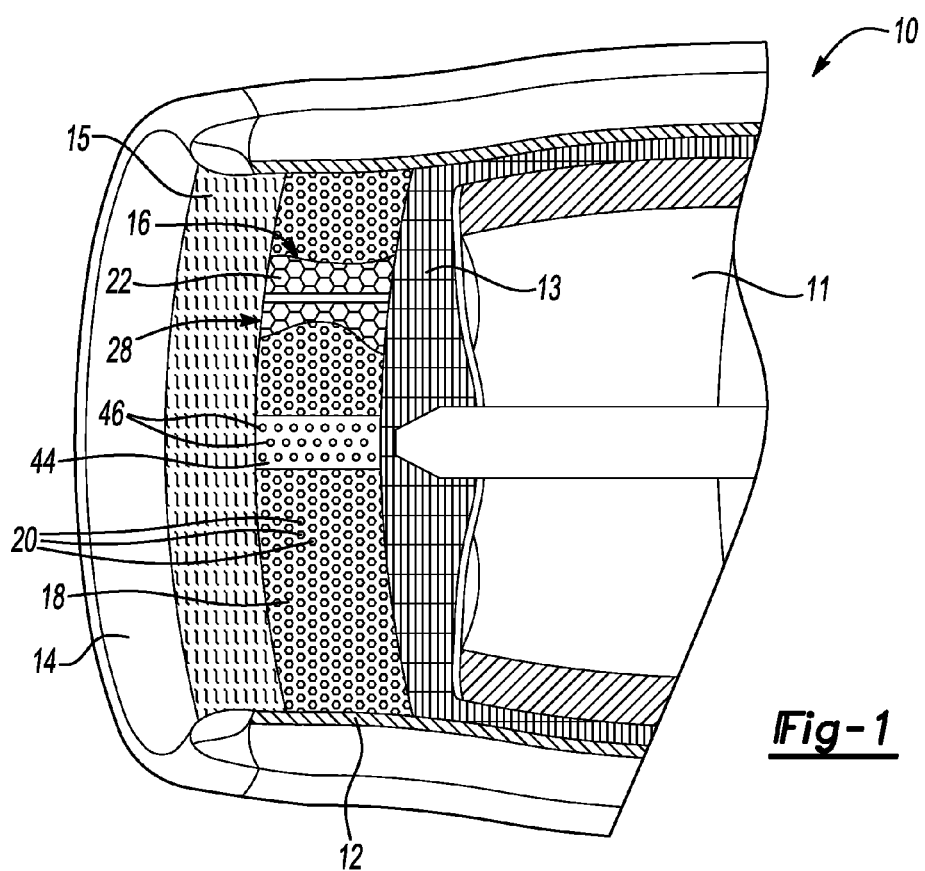
FIG. 1 is a sectional view of a fan case and liner assembly.

Referring to FIG. 1, a fan case 10 for a turbine engine includes a liner assembly 12, a liner strip 15 and a leading edge 14. The leading edge 14 guides airflow into and around the fan case 10. The liner strip 15 is provided between the liner assembly 12 and leading edge 14 and may also include noise attenuation features. The liner strip 15 can include other structures known by a worker versed in the art.

The liner assembly 12 forms an inner surface of the fan case 10 forward of a rub liner 13 and turbine blades 11. The liner assembly 12 includes a noise attenuation layer 16 covered by a face sheet 18. The face sheet 18 includes a first plurality of openings 20 that provide communication to the noise attenuation layer 16. The noise attenuation layer 16 includes a plurality of chambers 22 that each are in communication with at least one of the first plurality of openings 20. Acoustical energy generated by the engine enters the chambers 22 and is transformed into heat. Transforming the acoustical energy into heat dissipates and reduces noise emitted from the engine and fan case 10.

The noise attenuation layer 16 is joined at a seam 28, and the face sheet 18 is joined along an overlapping region 44. The seam 28 and overlapping region 44 are acoustically active to contribute to the overall noise attenuation performance of the liner assembly 12.

Figure 2:
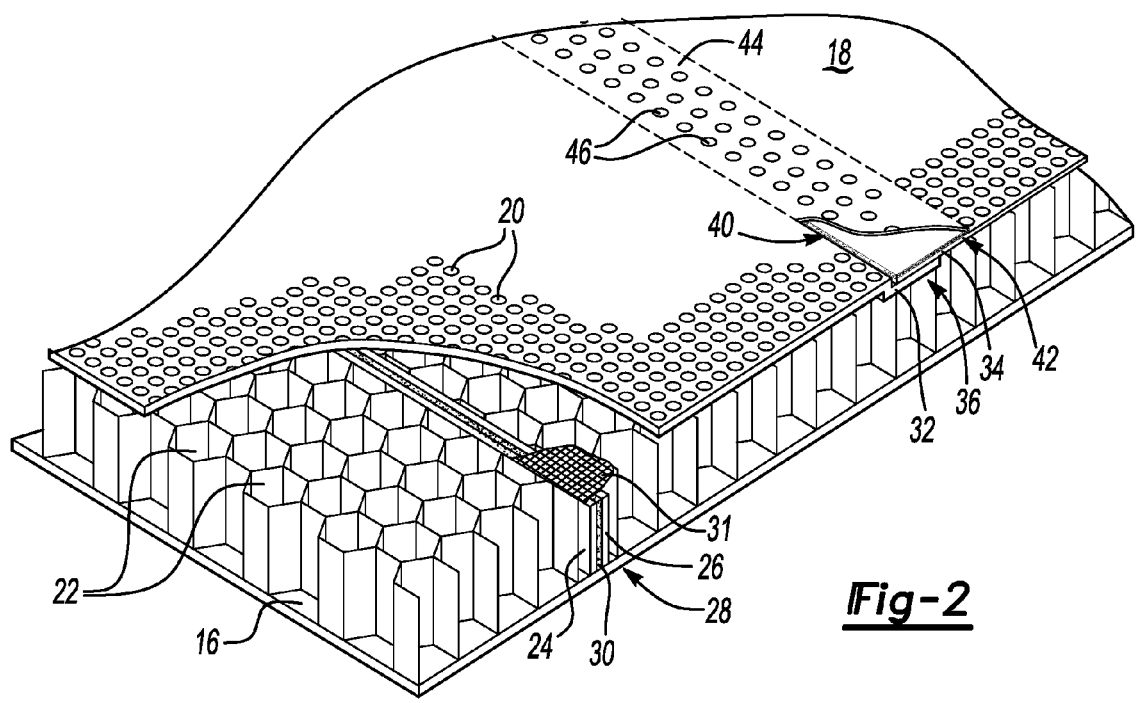
FIG. 2 is a perspective view of a seam and joint of the liner assembly.

Referring to FIG. 2, the noise attenuation layer 16 includes a first side 24 and a second side 26. The first and second sides 24,26 are joined at the seam 28 by an adhesive strip 30. The adhesive strip 30 preferably includes a narrow strip of scrim 31 supporting an adhesive. Although the example adhesive strip 30 includes scrim-supported adhesive, a worker with the benefit of this disclosure would understand that any type of adhesive strip is within the contemplation of this invention.

The example noise attenuation layer 16 is formed in a single sheet that is wrapped around the inside of the fan case 10 and joined at the seam 28. The seam 28 extends axially within the fan case 10. Conventional seams utilize adhesive that fills one or two rows of chambers 22 on each side of the seam 28. This results in an undesirable acoustically dead zone.

The first and second sides 24,26 are substantially perpendicular to the inner surface of the face sheet 18 and are joined by the adhesive strip 30. The seam 28 provides a relatively thin joint between the sides 24,26 of the noise attenuation layer 16. The seam 28 of this invention utilizes the adhesive strip 30 that bonds the first side to the second side 24,26 without filling any of the adjacent chambers 22. The relatively thin seam 28 and the open chambers 22 adjacent the seam 28 provide acoustical transparency that improves noise attenuation performance of the liner assembly 12.

The face sheet 18 is a single sheet of a desired length of the liner assembly 12. The face sheet 18 includes a first end 32 attached to a second end 34 at a joint 36. The joint 36 accommodates expansion and contraction of the face sheet 18 that occurs as a result of the extreme temperatures encountered during typical operation. The joint 36 is preferably a shiplap joint, however other expansion joints known to a worker versed in the art are within the contemplation of this invention.

The joint 36 includes overlapping portions of the face sheet 18. The overlapping portions of the joint form a seam 40 that is filled with an adhesive 42. The joint 36 is covered with the adhesive 42 to fill the joint 36 and provide a continuous uninterrupted surface on the inner surface of the fan case 10. The uninterrupted surface eliminates any inconsistencies in airflow that may result from an exposed joint. Overlapping the first and second ends 32, 34 along with filling of the seam 40 with adhesive 42 results in the overlapping region 44 of blocked openings. The blocked openings prevent communication of sound energy with the noise attenuation layer. Blocking of the openings results in an acoustically dead area the size of the overlapping region 44 that degrades acoustic performance of the liner assembly 12.

A second plurality of openings 46 are formed within the overlapping region 44 to provide communication of sound energy through the joint 36 to the noise attenuation layer 16 underlying the overlapping region 44. Formation of the second plurality of openings 46 within the overlapping region 44 provides for communication of sound energy through the joint 36, resulting in an acoustically live joint 36 that adds to the attenuation of noise from the engine.

Figure 3:
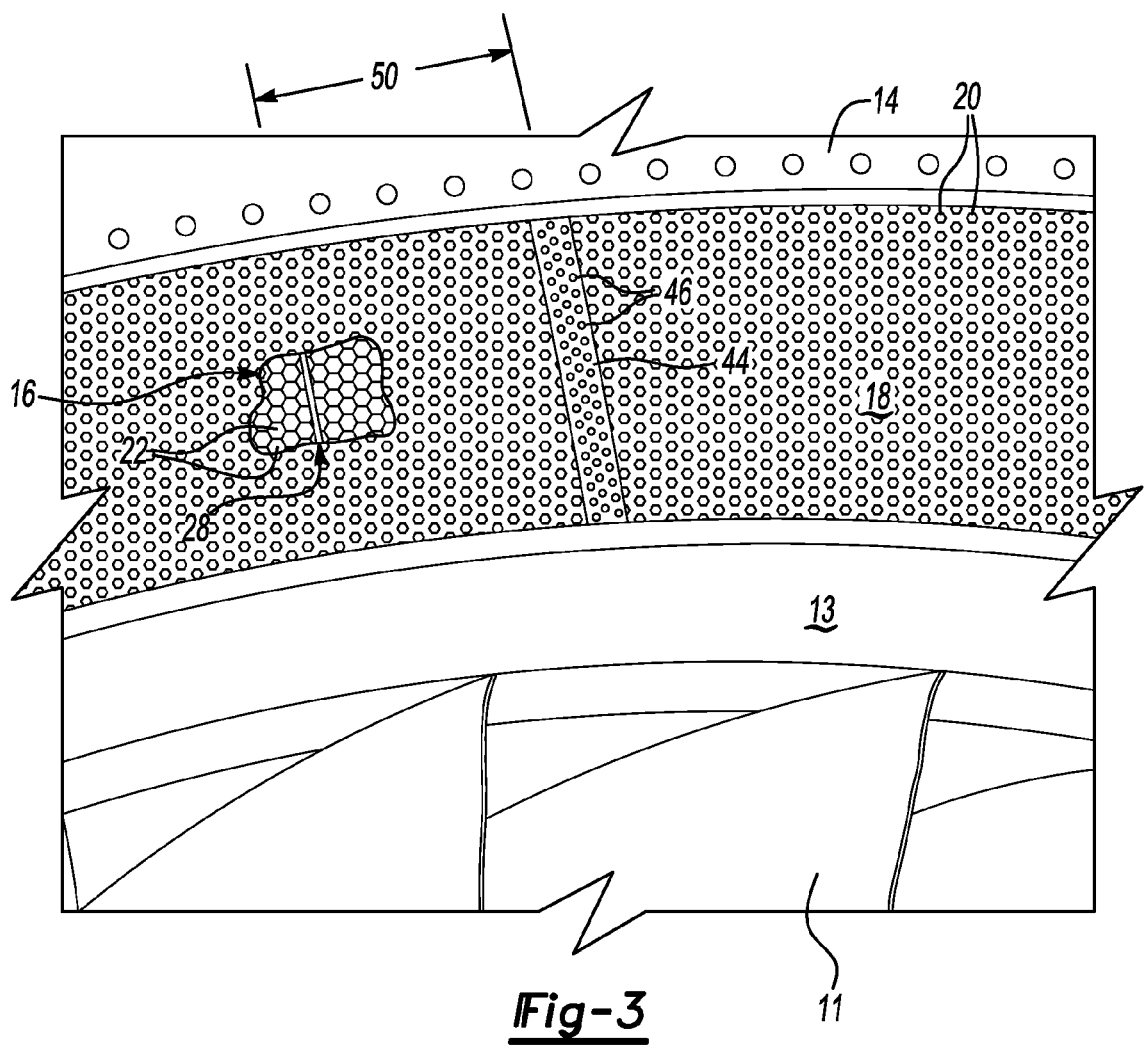
FIG. 3 is a plan view of a section of the liner assembly.

Referring to FIG. 3, an enlarged section of the liner assembly 12 is shown with the overlapping region 44 and the seam 28. Each of the second plurality of openings 46 has a larger area than the first plurality of openings 20. Further, the second plurality of openings 46 are spaced a greater distance apart relative to the first plurality of openings 20. The configuration provides the desired level of acoustic performance without weakening the joint 36. Utilizing larger and fewer openings within the overlapping region 44 maintain the desired strength of the joint 36, while continuing to provide communication of sound energy with the noise attenuation layer 16.

The overlapping region 44 and seam 28 are disposed axially within the fan case 10 and are offset a circumferential distance 50 from each other. The staggered or non-aligned relative position of the joint 36 relative to the seam 28 further improve the noise attenuating performance of the liner assembly 12.

The liner assembly 12 is assembled by the steps of first placing the noise attenuation layer 16 on a support surface within the fan case 10. The noise attenuation layer 16 is wrapped about the inner surface of the fan case 10 such that the first side 24 abuts the second side 26. The seam formed by the abutted sides 24, 26 is disposed axially within the fan case 10. Although, it is preferable to utilize a single sheet to form the noise attenuation layer 16, it is within the contemplation of this invention to utilize several sections of noise attenuation layer 16 joined together at sides within a plane perpendicular to the face sheet 18. The joint formed utilizing the adhesive strip 30 provides a substantially thin seam that is transparent acoustically to the function of the fan case 10.

Once the noise attenuation layer 16 is in place, the face sheet 18 is placed over the noise attenuation layer 16. The first and second ends 32,34 are abutted to form the axial joint 36 of the face sheet 18. The joint 36 is then filled with the adhesive 42 to provide a substantially uninterrupted inner surface. The adhesive 42 is filled along adjacent sides of the joint 36 to form the axial overlapping region 44. The assembly process further includes formation of the second plurality of openings 46 within the overlapping region 44. The second plurality of openings 46 open the underlying noise attenuation layer 16 to communication with acoustic energy generated from the engine.

The joint 36 and seam 28 for the face sheet 18 and the noise attenuation layer 16 provide acoustically superior performance relative to conventional joining techniques. The joint 36 and seam 28 become essentially transparent acoustically that provides increased noise attenuation performance. Further, the joint 36 and seam 28 of this invention provide improved performance and ease assembly of the liner assembly. The improved noise attenuation performance reduces the magnitude of noise emitted from the fan case 10 to comply with desired levels.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of fabricating a liner assembly for a fan case, said method comprising the steps of:
   a. assembling a face sheet including a first plurality of openings over a noise attenuation structure;
   b. joining a first end of said face sheet to a second end of said face sheet by overlapping the first and second ends to form a joint;
   c. covering an outer surface of the first end and the second end of the joint with a filler; and
   d. forming a second plurality of holes through the filler and the joint for communicating sound energy to said noise attenuation structure through said joint.

2. The method as recited in claim 1, including the step of joining a first side of the noise attenuation structure to a second side of the noise attenuation structure with an adhesive to form a seam.

3. The method as recited in claim 2, wherein the joint and the seam extend axially within the fan case.

4. The method as recited in claim 3, including spacing said joint and said seam a circumferential distance apart.

5. The method as recited in claim 1, wherein said second plurality of holes is larger than said first plurality of holes.

6. The method as recited in claim 1, wherein said step b. comprises joining said first and second ends with a lap joint.

* * * * *